March 13, 1956 R. G. RUSSELL 2,738,138
CONVEYOR SYSTEM, PARTICULARLY FOR USE WITH ROLLING MILLS
Filed April 17, 1951 6 Sheets-Sheet 1

Inventor
ROBERT GORDON RUSSELL
By Bailey, Stephens & Huettig
Attorneys

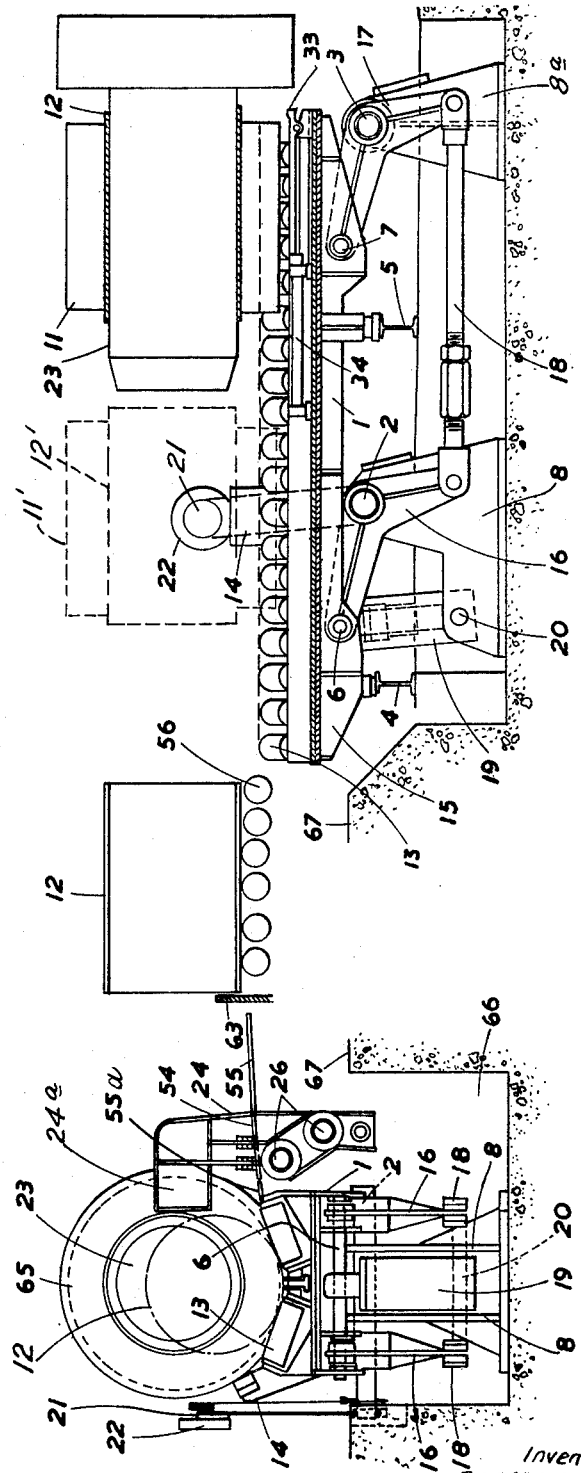

March 13, 1956 R. G. RUSSELL 2,738,138
CONVEYOR SYSTEM, PARTICULARLY FOR USE WITH ROLLING MILLS
Filed April 17, 1951 6 Sheets-Sheet 3

Inventor
ROBERT GORDON RUSSELL
By Bailey, Stephens & Huettig
Attorneys

March 13, 1956 R. G. RUSSELL 2,738,138
CONVEYOR SYSTEM, PARTICULARLY FOR USE WITH ROLLING MILLS
Filed April 17, 1951 6 Sheets-Sheet 5

Inventor
ROBERT GORDON RUSSELL
By Bailey, Stephens & Huettig
Attorneys

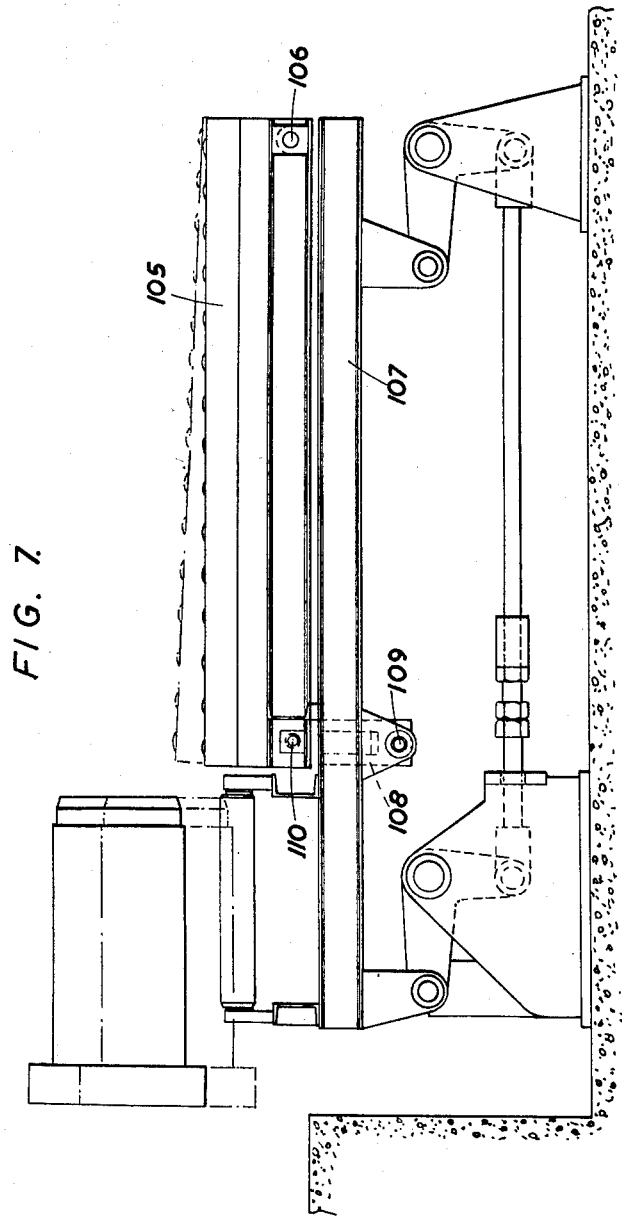

United States Patent Office 2,738,138
Patented Mar. 13, 1956

2,738,138

CONVEYOR SYSTEM, PARTICULARLY FOR USE WITH ROLLING MILLS

Robert Gordon Russell, Sheffield, England, assignor to Davy and United Engineering Company Limited, Sheffield, England Application April 17, 1951, Serial No. 221,382

Claims priority, application Great Britain April 19, 1950

14 Claims. (Cl. 242—79)

This invention relates to conveyor systems, particularly for use with rolling mills.

In strip rolling mills, coils of strip metal are mounted in succession on a reel and unwound from the reel as they are fed into the mill. Hitherto it has been customary to employ a travelling carriage with a lift to mount each coil on the reel but this has involved certain disadvantages, particularly the use of moving fluid motors with travelling flexible connections. One aim of the invention is, therefore, to provide a more robust, simple and serviceable construction which, moreover, after mounting a coil on the reel may almost immediately be rendered ready to deliver a second coil.

According to the invention, the aforesaid aim is achieved by mechanism provided with a conveyor track and with means for adjusting the height of the conveyor track, after the coil has been mounted thereon, so as to bring the coil into axial register with the reel and enable the coil to be fed along the track onto the reel. In one form of the mechanism the track is constituted by a series of rollers and these may be freely mounted so as to enable the coil to be pushed along them, for example, by a fluid operated ram. So as to enable the coil axis substantially to register with the reel axis, it is preferable so to form the track transversely that the coil naturally lies thereon with its axis in a vertical plane bisecting the reel. Conveniently, the coil may be fed laterally onto the track and a stop provided to prevent the coil from rolling beyond the track.

While the invention is concerned with the feeding of strip to rolling mills, it is obvious that it can be applied without modification to the feeding of strip to other machines. However, the invention is not limited to such purposes but is concerned with conveyor systems generally, and according to another aspect of the invention mechanism for mounting a coil or other hollow body on a reel, journal or other mating element is provided with a freely running conveyor track, means for adjusting the height of the track and with means for pushing one of the two mating elements along the track onto the other of the two elements.

The invention has various other applications to rolling mills or strip processing lines. For example, the conveyor system may be used to discharge coils from reels on which they have been found. In such an arrangement, if the strip is wound on a spool, the conveyor track may be raised to deliver the spool to the reel and then lowered to receive the wound coil which may be discharged by a ram assembly on to the track.

The invention further includes the modification in which the mechanism is used for removing a coil or other hollow body from a reel, journal or other mating element and includes means for pushing one of the two mating elements off the other onto a freely running conveyor track which is adjustable in height and also capable of being tilted so as to discharge one of the elements under gravity.

In order that the invention may be clearly understood and readily carried into effect, constructions in accordance therewith will now be described, by way of example, with reference to the accompanying drawings, in which:

Figure 2 is an end elevation of part of the system of Figure 1, the elevation being a section on the line II—II in Figure 1.

Figure 3 is a section on the line III—III in Figure 1,

Figure 7 is a side elevation showing a modification of the system of Figure 6.

Figure 1:
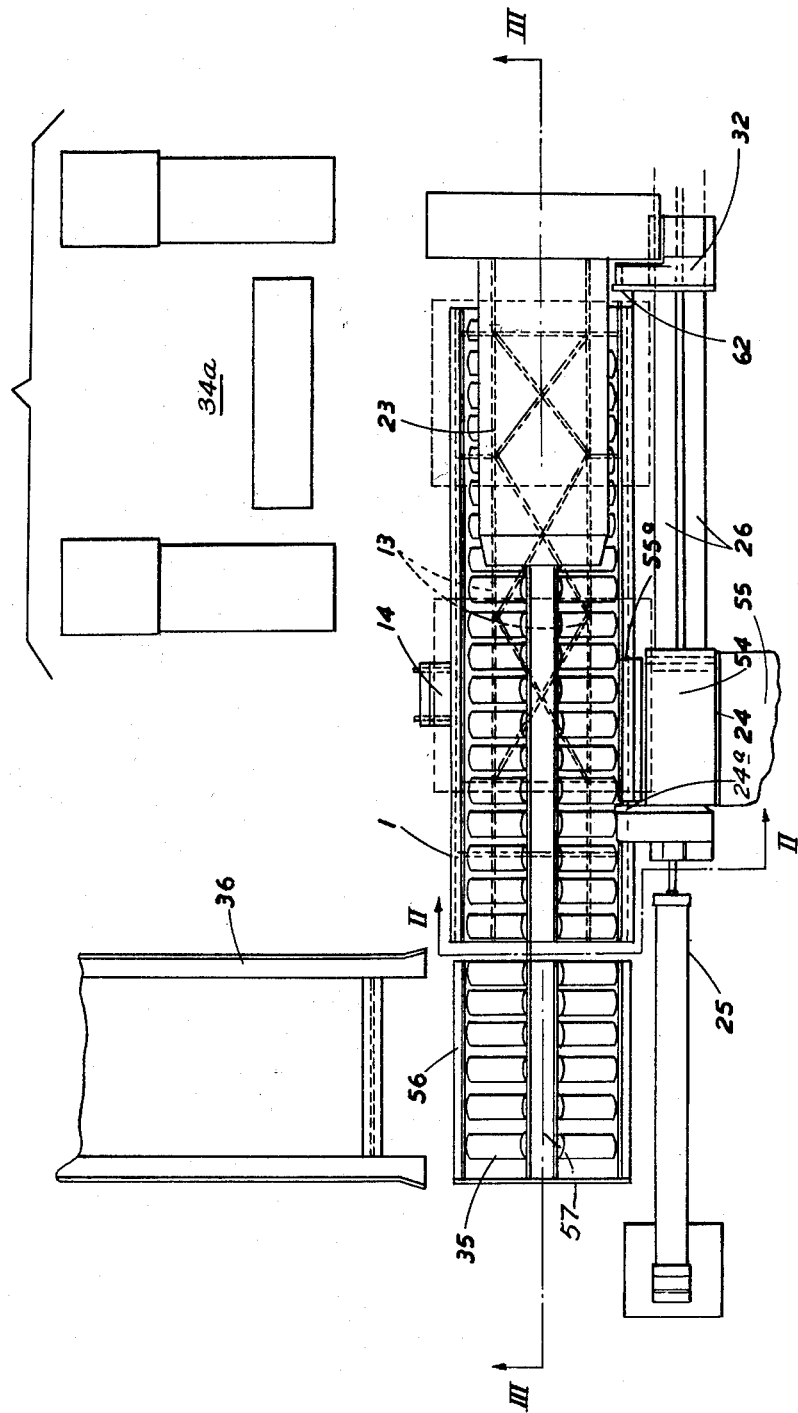
Figure 1 is a plan of a conveyor system for loading coils on the pay-out reel of a rolling mill.
Figure 4:
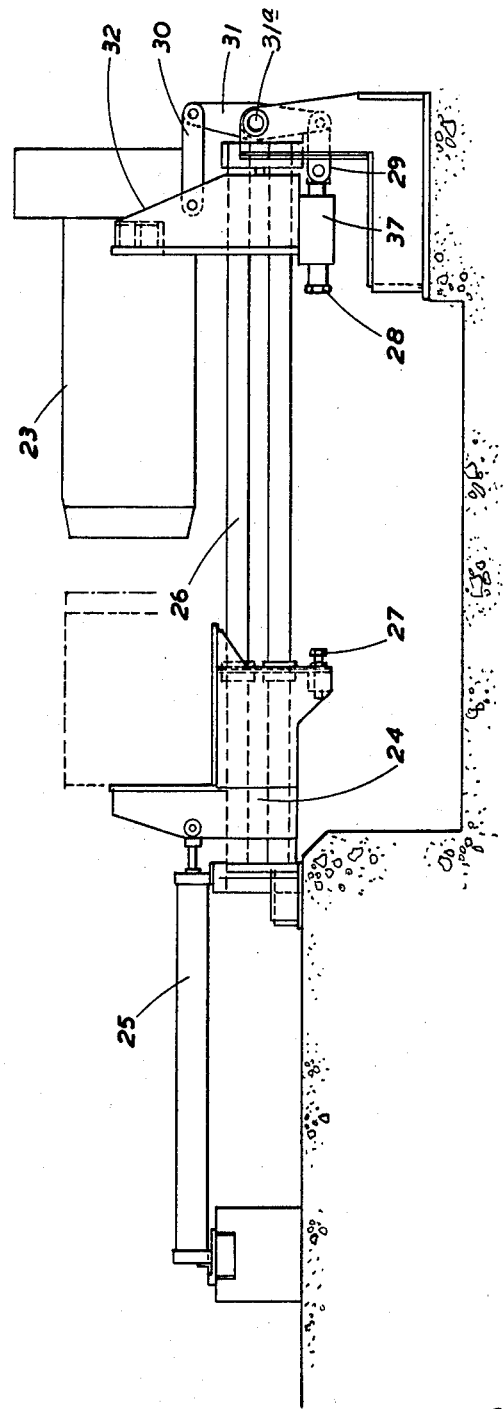
Figure 4 is a side elevation of part of the system of Figure 1.

Referring first to the construction shown in Figures 1 to 5, each coil 11 wound on a spool 12 to be mounted on a pay out reel 23 is fed substantially from the chain line position 11', 12' to the full line position 11, 12 along a conveyor track which consists of a series of pairs of rollers 13, the rollers in each pair being arranged side-by-side as a small angle to one another so that the track constitutes a cradle in which the coil will centre itself. The track is mounted horizontally in a frame 1 carried by two pairs of bell-crank levers 16, 17 pivoted about fixed horizontal axes 2,3 at right angles to the track, the levers 16 being linked to the levers 17 by links 18, adjustable in length, so as to provide a parallelogram linkage. The upper arms of the bell-crank levers 16, 17 are pivoted to the frame 1 at axes 6, 7. The aforesaid axes 2 and 3 are those of transverse shafts carried by a famework comprising fixed pairs of plates 8, 8a. In its lowermost position the frame rests on transverse stops 4, 5 shown only in Figure 3. The roll of strip to be mounted on the reel 23 is rolled onto the track from one side in a manner described below and a stop 14 is fixed to the frame so as to prevent it from rolling over the other side.

When the coil has been loaded on the track, assuming that the track is not already at the correct height, fluid under pressure is admitted to an oscillating single-acting piston and cylinder assembly 19 pivotally connected between the frame 1 at the axis 6 and a shaft 20 mounted between the pair of plates 8. Thus, the track is raised to a position in which the coil axis is substantially in alignment with the axis of the reel 23. So as to indicate at all times the position of the track, an indicator 22, conveniently situated, is connected by a sprocket and chain mechanism 21 to a shaft which rotates co-axially on the axis 2 with the pair of bell-crank levers 16.

Figure 5:
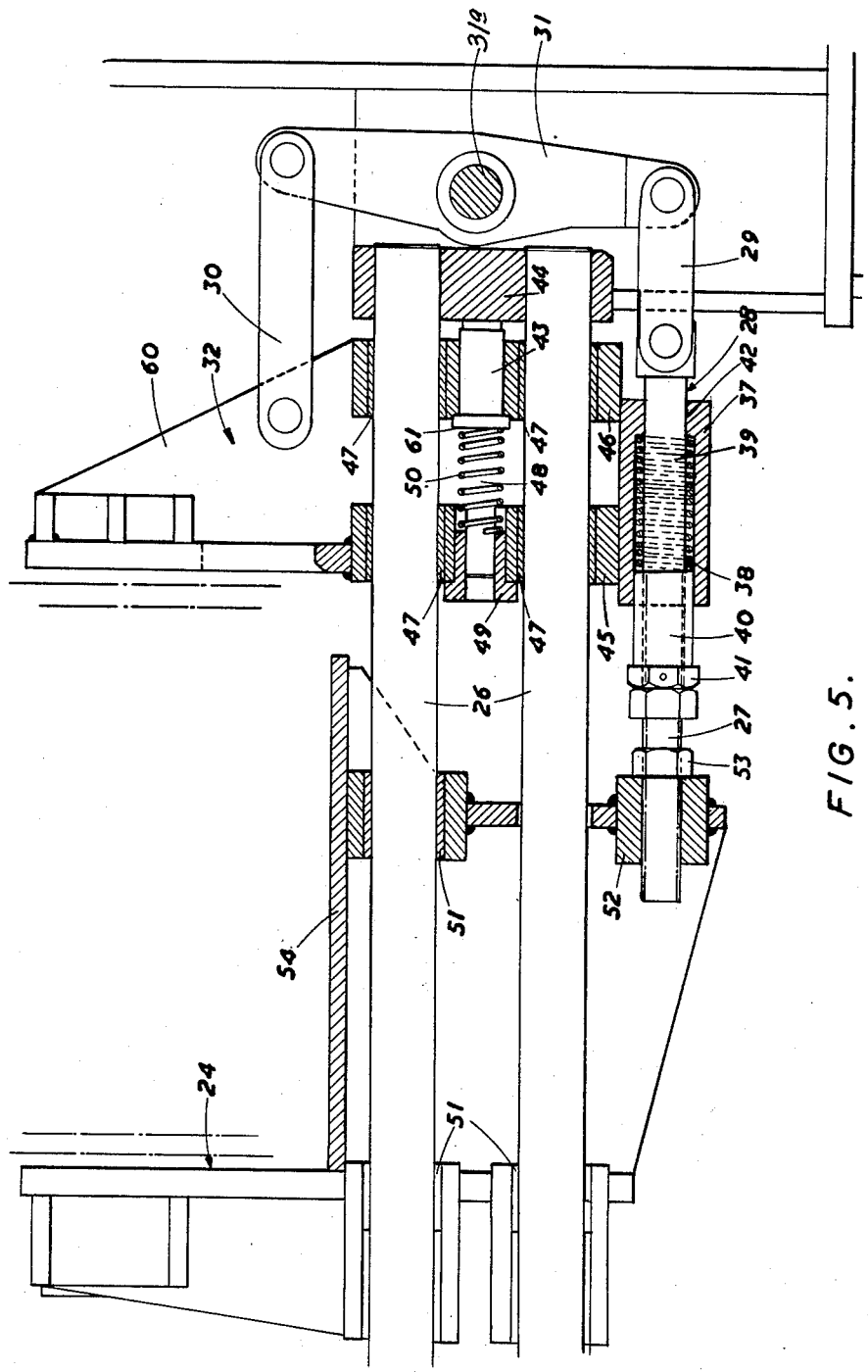
Figure 5 is a sectional elevation, on a greatly enlarged scale, of a detail of the system of Figures 1 to 4.

When the coil has been raised, a lateral extension 24a on a slide 24, mounted on two fixed guide rods 26 parallel to the track and driven by a compressed air actuated double acting ram assembly 25, engages one end of the coil and pushes it along the track. The guide rods 26 are located on one side of the track and it will be seen that the lateral extension 24a projects inwards so as to engage the rear of the coil, at one side thereof. Any tendency for the coil to slew is counteracted by the angle between the rollers in each pair of rollers. As the coil reaches its terminal position, its forward end engages a second slide 32 mounted on the guide rods 26 and connected by a link 30 to one end of a lever 31 pivoted at its centre about a fixed horizontal axis 31a. The opposite end of the lever is connected by a second link 29 to a tappet rod 28, slidable horizontally in a bush 37 carried by the second slide 32. The free end of this rod constitutes a stop arranged to engage an adjustable stop or abutment in the form of a bolt 27 mounted directly on the first slide 24. When these stops make contact the second slide is moved in the opposite direction to that of the first until the second slide 32 engages the coil and the coil is brought to rest in the correct axial position on the reel. The engagement of the tappet rod 28 with the bolt 27 reduces the axial load on the coil. The pneumatic ram assembly 25 is arranged thereupon to yield or to be automatically reversed. The reel is then expanded to grip the coil. The strip metal can then be withdrawn from the reel and the track lowered. This is done by means of the ejector hook 33 and the double-acting cylinder and piston assembly 34 (Fig. 3). If the coil 11 is not carried by a spool 12, the track can then receive another coil that will be in a position to be fed on to the reel as soon as the first coil has been paid off. The position of the first pair of rolls in the mill appears at 34a in Figure 1. Figure 5 shows in greater detail the mechanism associated with the slides 24 and 32. It will be seen that the bush 37 contains a compression spring 38 and that the tappet rod 28 comprises a stem 39 to which is screwed a sleeve 40 formed with a head 41. The sleeve 40 slides in the main portion of the bush 37 while the stem 39 slides in a flange 42 at the end of the bush, the compression spring 38 being interposed between the flange 42 and the end of the sleeve 40. When the tappet rod 28 is moved to the right, as viewed in Figure 5, the second slide 32 with the bush 37 is moved to the left while the spring 38 is compressed. When the slide 24 with the abutment 27 is withdrawn, the spring 38 returns the tappet rod 28 and the slide 32 to their original positions, the movement being limited by a spring loaded buffer 43 (carried by the second slide 32) striking a stationary support 44 for the right-hand ends of the rods 26. It will be seen that the second slide 32 comprises a pair of upright side panels 60 between which are secured two transverse members 45 and 46 carrying four bushes 47 which slide on the rods 26. The buffer 43 slides in a passage in the transverse member 46 and its movement relatively thereto is limited by a flange 61. The buffer is formed with a stem 48 which slides in a bush 49 screwed into the transverse member 45. A compression spring 50 is interposed between the flange 47 and the bush 49. It will be seen from Figure 1 that a lateral projection 62 is provided at the top of the slide 32. This projection 62 is the actual part of the slide 32 that engages the coil.

The first slide 24 is also a box structure and it carries three bearings 51 running on the rods 26 and a threaded support 52 for the abutment 27, the adjusted position of which is secured by a lock nut 53. The box structure includes an inclined plate 54 over which each coil rolls from a fixed ramp 55 (Figure 2) onto the conveyor rollers. A flange 55a is provided on the frame 1 so as to provide a continuation of the track comprising the ramp 55 and plate 54.

Where the coils 11 are carried by spools 12, means must be provided to eject the spent spool from the reel before the next coil can be mounted. For this purpose a pneumatically operated ejector hook 33 is carried at the centre of the conveyor frame 1 which, after the coil has been unwound, is raised further to bring the ejector hook into register with the edge of the spool. One such spool 12 carrying a coil 11 is shown mounted on the reel 23 in Figure 3. The reel 23 is caused to contract and air is admitted to a double-acting cylinder and piston assembly 34 to cause the hook to throw the spool sharply off the reel 23 on to the track 13 (Fig. 2). The spool 12 can then be fed manually along the track to an extension track mounted at the height of the raised main track. This extension track 35 consists of rollers arranged similarly to those in the main track, but the rollers are carried by a frame 56 arranged to tilt about the longitudinal axis 57 so as to tip the spool on to a transfer table 36. A second spool 12 is shown mounted on the track 35 in Figure 3. A fixed stop plate 63 limits the longitudinal movement of the spool 12.

In Figure 2 the circles 64 and 65 show the limits of size that can be accommodated by the conveyor track. The circle 64 shows an unloaded spool which may be of the order of eighteen inches diameter, while the circle 65 shows the diameter of a coil of such diameter that it is already coaxial with the reel, so that the track does not have to be lifted prior to mounting the coil on the reel. It will be observed that the tip of the reel is tapered so as to facilitate the mounting of the spool. So that the various parts may be at a convenient height, the supporting structure for the conveyor track is mounted in a well 66 below floor level 67.

Figure 6:
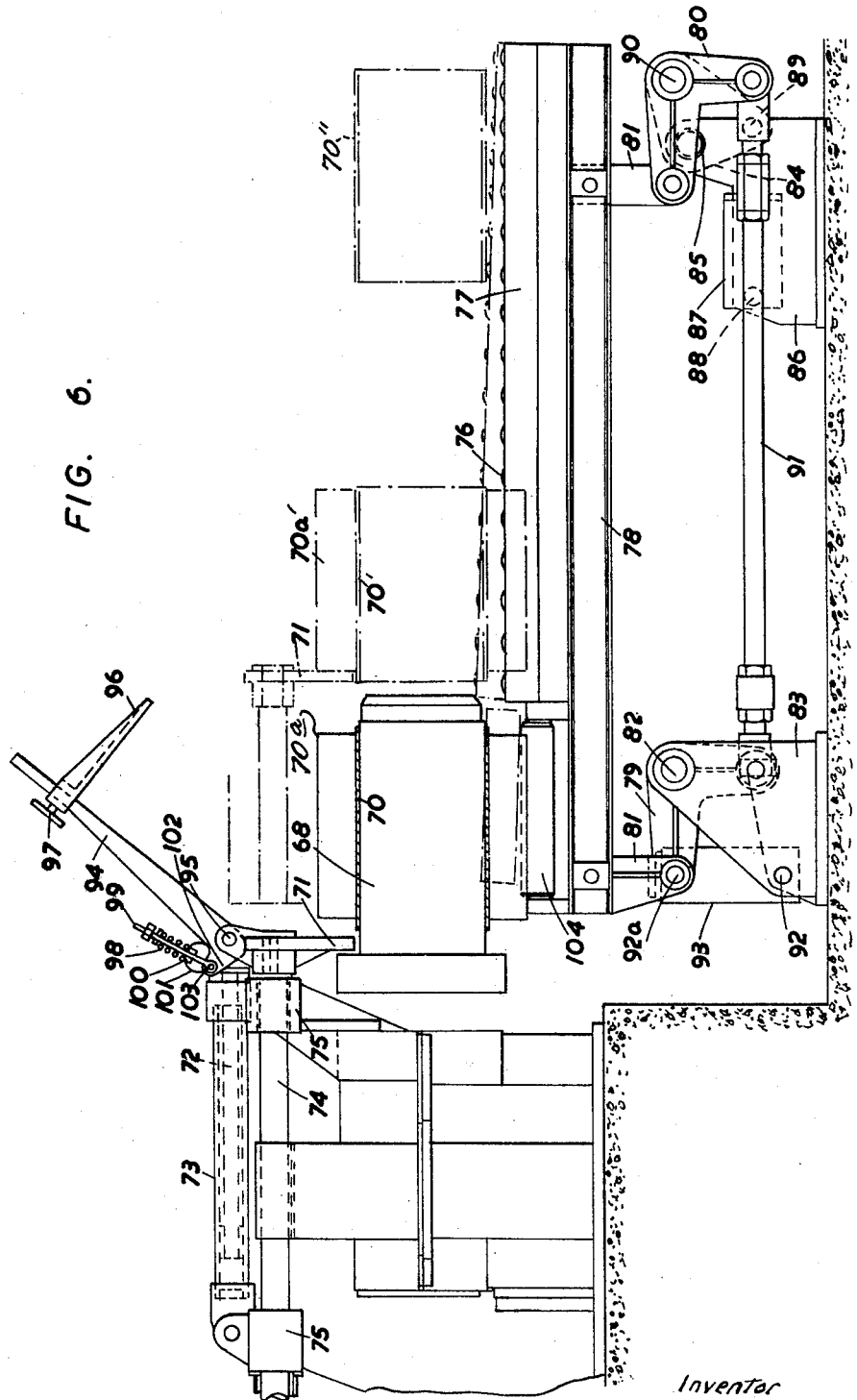
Figure 6 is an elevation of a conveyor system which is a modification of that shown in Figures 1 to 4 and which is arranged for discharging reels from the tension reel of a rolling mill.

Referring to Figure 6, a reel 68 is driven by gearing (not shown) so as to wind strip on a spool 70. When the winding of a coil 70a has been completed the reel is caused to contract and a stripper 71 is thrust forward from the full line position to the chain line position by parallel double-acting rams 72 arranged to reciprocate in hydraulic cylinders 73. The stripper is carried by parallel rods 74 mounted to slide horizontally in guides 75. Only one ram 72 and only one rod 74 appear in Figure 6 because the parts are seen in side elevation. A track 76 comprising rollers, arranged in V formation as in the construction of Figures 1 to 3, is set at the correct height to receive the coil 70a and spool 70 assembly as it is thrust off the reel 68 to the chain line position 70a', 70'. The rollers are carried by a frame 77 which, in turn, is carried by a sub-frame 78. The latter carries lugs 81 by which it is supported by two pairs of bell-crank levers 79, 80. The bell crank levers 79 are arranged side-by-side on a common fixed axis 82 provided by a shaft mounted in a frame 83. The bell-crank levers 80 on the other hand are mounted on a common movable axis 90 provided by a shaft mounted between a pair of plates 84 pivoted at a fixed horizontal axis 85 to a frame 86. A single acting piston and cylinder assembly 87 is pivotally connected between a fixed axis 88 on the frame 86 and an axis 89 on the plates 84. Links 91 connect the lower arms of the bell crank 79 to the lower arms of the bell-crank levers 80. A single-acting piston and cylinder assembly 93 is pivotally connected between a fixed axis 92 on the frame 83 and the axis 92a at which the bell-crank levers 79 are pivoted to the left-hand lugs 81.

When a coil 70a is discharged onto the conveyor track 76, the axis 90 of the bell-crank levers 80 is in the same horizontal plane as the axis 82 of the bell-crank levers 79. Immediately the coil and spool have been thrust off the reel 68 to the chain line position 70', 70a', the pressure operated ram and cylinder assembly 73 is operated to withdraw the stripper 71 to the full line position, pressure is admitted beneath the piston in the assembly 93 to lift the conveyor track to the top of its stroke and pressure is then released from the left-hand end of the piston and cylinder assembly 87 to lower the axis 90 and therefore lower the right-hand end of the conveyor track. Thus, the coil is caused by gravity to run down the conveyor track (now in the position shown by chain lines) onto a continuation track (not shown).

The next step in the operation is to admit pressure once more to the piston and cylinder assembly 87 so that the axis 90 is raised as well as the right-hand end of the conveyor track 76. The latter is then horizontal and disposed at such a height that a spool 70" loaded thereon can be fed straight onto the reel 68. For that purpose the stripper 71 is fed to the right once more and a lever 94, pivoted at 95 to the stripper, is depressed so as to bring an arm 96 down in front of the spool, after the latter has been pushed manually against the stripper 71. A hand wheel 97 is provided to enable the arm 96 to be clamped in any one of a number of positions along the lever 94 to centre the spool relatively to the centre line of the mill. The latter is normally held in the raised position shown in Figure 6 by a tension spring 98 connected between the upper end of a rod 99 and a sleeve 100 through which the rod 99 passes. The sleeve 100 is pivoted about an axis at right angles to the rod, the sleeve 100 being pivotally mounted between lugs 101 carried by the stripper 71. The lever 94 carries an extension 102 and the rod 99 is pivoted to this extension at 103. When the lever 94 is depressed, the pivot 103 passes over a dead-centre position so that the spring 98 then holds the lever down. The piston and cylinder assembly 87 is then caused to withdraw the stripper 71 to the left so that the arm 96 pulls the spool onto the reel in its contracted condition. After the spool has been positioned as required, the reel is caused to expand to grip the spool. Also the lever 94 is raised manually so as to return the pivot 103 through the dead-centre position, whereupon the spring 98 raises the lever 94 to the position of Figure 6 and holds it in that position. The assembly is then ready to wind the strip on the spool.

The sub-frame 78 carries a pair of parallel rollers 104 which bear against the coil before it is discharged, and while it is being discharged, from the reel so as to prevent the strip from becoming uncoiled.

Figure 7 shows a method of modifying the conveyor system of Figure 6. In Figure 7, the pairs of inclined rollers are carried by a frame 105 pivoted about an axis 106 to a sub-frame 107. The latter is carried by a parallelogram linkage and actuated as in the construction of Figures 1 to 3 so that it always remains horizontal. However, the frame 105 can be tilted about the axis 106 by means of a single-acting piston and cylinder assembly 108 pivoted to the sub-frame 107 at 109 and to the frame 105 at 110.

I claim:

1. Conveyor mechanism for moving a coil of strip relatively to a rotatable reel, said mechanism comprising in combination, a reel, a freely running conveyor track adjacent said reel and mounted upon an immovable base, means fixed to the base for adjusting the height of said track towards and away from an elevation in which a coil resting thereon is substantially in axial alignment with said reel, and means fixed to a base separate from said conveyor for thrusting a coil along said track between positions respectively in which the coil surrounds said reel and in which the coil is beyond said reel.

2. Conveyor mechanism for mounting a coil or other hollow element on a reel, journal or other mating element, said mechanism comprising, in combination, a conveyor track including a series of freely running rollers and a frame supporting said rollers, an immovable base supporting said frame, means fixed to said base for raising and lowering said track, while in a substantially horizontal position, to and from an elevation wherein the elements are in mating alignment with one another, and means fixed to a base separate from said frame for thrusting one of the elements along said track between positions in which it mates with the other element and in which the elements are separated from one another.

3. Conveyor mechanism according to claim 2, in which said rollers are mounted in pairs parallel to one another, the rollers in each pair being set at an obtuse angle to one another, thereby providing a V-shaped cradle for one of the mating elements.

4. Conveyor mechanism for mounting a coil or other hollow element on a reel, journal or other mating element, said mechanism comprising, in combination, freely running, horizontally running conveyor means, a frame supporting said conveyor means, a parallelogram linkage supporting said frame and including supporting levers spaced a substantial distance apart along said frame, power means for causing said frame to rise parallel to itself on said linkage, and means for thrusting one of the elements along said conveyor means between two positions in which it mates with the other element and in which the elements are separated from one another, said last mentioned position lying wholly between said levers.

5. Conveyor mechanism according to claim 4, in which said power means consists of a fluid-operated piston and cylinder assembly.

6. Conveyor mechanism for mounting a coil or other hollow element on a reel, journal or other mating element, said mechanism comprising, in combination, freely running conveyor means arranged for one of said elements to be fed therealong into mating engagement with the other said element, a slide arranged to engage one end of said first-mentioned element and thrust same along said conveyor means onto the second element, a second slide adapted to engage the opposite end of said first element, guiding means for said slides, a stop member fixed to said first slide, a second stop member slidably mounted on said second slide to be engaged by said first stop member, a two-armed lever pivotally connected at one end to said second slide and at the other end to said second stop member, and fixed fulcrum means for said lever, the arrangement being such that the movement of said first element is arrested when it is engaged by both said slides and said stops are in contact with one another.

7. Conveyor mechanism according to claim 6, wherein said stops are adjustable in length.

8. Conveyor mechanism according to claim 6, comprising also resilient means operable on said second slide to return same to an initial position while said first slide is withdrawn from said first element.

9. Conveyor mechanism for feeding a coil of strip, wound on a spool, onto a rotatable reel, said mechanism comprising, in combination, a reel, a conveyor track, and immovable base supporting said track, means fixed to said base for adjusting the height of said track to bring a coil mounted thereon into axial alignment with the reel and for further adjusting the height of said track to a second position to receive the spent spool after the coil has been unwound, means fixed to a base separate from said track for feeding the coil along said track onto the reel, and means spaced from said reel and carried by said track for ejecting the spent spool onto said track.

10. Conveyor mechanism according to claim 9, in which said means for ejecting the spent spool consists of a fluid actuated ejector hook.

11. Conveyor mechanism according to claim 9, comprising also an auxiliary conveyor track mounted at a height such as to form a continuation of said first-mentioned conveyor track when in said second position and thus to receive spent spools therefrom, said auxiliary track being arranged to tilt sideways so as to discharge spent spools therefrom, and each of said tracks comprising pairs of rollers mounted so as to provide V-shaped cradles along which the spools can be fed.

12. Conveyor mechanism for discharging coils of strip wound on spools from a rotatable reel, said mechanism comprising, in combination, freely running conveyor means, a frame carrying said conveyor means, means supporting said frame for rising and falling motion, power means for raising said frame and said conveyor means with respect to said reel, a stripper for thrusting coils off one reel onto said conveyor means when the latter are in a lower position, power means for moving said stripper to-and-fro, a lever pivoted to said stripper, an arm projecting from said lever, and means for holding said lever selectively in an inner spool engaging and in an outer position.

13. Conveyor mechanism according to claim 12, said arm being adjustably mounted on said lever to accommodate spools of different lengths.

14. Conveyor mechanism for mounting a coil of strip on a reel for feeding the strip to a machine for operating thereon, said mechanism comprising, in combination, a reel, a conveyor track including a series of freely running rollers arranged in pairs set so as to form a V-shaped cradle, a frame supporting said rollers, means for raising and lowering said track between a lower position and a higher position in which the coil is in axial alignment with said reel, ramp means for feeding a coil laterally onto said cradle when in said lower position, said ramp means including a stationary portion and a movable portion providing a continuation of said stationary portion, a stop for preventing said coil from rolling beyond said cradle when fed laterally thereto, a thrust member for feeding the coil along said track when in higher position onto said reel, and said movable portion being integral with said thrust member.

References Cited in the file of this patent

UNITED STATES PATENTS

| | | |
|---|---|---|
| 1,757,772 | Johnson | May 6, 1930 |
| 1,956,906 | Mikaelson | May 1, 1934 |
| 2,185,360 | Talbot | Jan. 2, 1940 |
| 2,189,716 | Kash | Feb. 6, 1940 |
| 2,218,499 | Wood | Oct. 22, 1940 |
| 2,228,477 | Nash et al. | Jan. 14, 1941 |
| 2,419,699 | Wood | Apr. 19, 1947 |